United States Patent [19]

Harrigan

[11] Patent Number: 4,520,981
[45] Date of Patent: Jun. 4, 1985

[54] ADJUSTABLE TELESCOPIC SUPPORT

[75] Inventor: Marvin Harrigan, Elk Grove Village, Ill.

[73] Assignee: Marvco Tool & Mfg. Inc., Elk Grove, Ill.

[21] Appl. No.: 497,096

[22] Filed: May 23, 1983

[51] Int. Cl.³ ............................................ F16M 11/00
[52] U.S. Cl. .................................. 248/413; 248/125; 248/161; 248/188.7
[58] Field of Search ............ 248/413, 158, 161, 188.7, 248/405, 125

[56] References Cited

U.S. PATENT DOCUMENTS

| 1,663,357 | 3/1928 | Stefan | 248/413 |
| 1,782,660 | 11/1930 | Meyer | 248/413 |
| 2,248,369 | 7/1941 | Ludersen | 248/413 |
| 2,628,142 | 2/1953 | Dubach | 248/413 |
| 3,637,179 | 1/1972 | Marschak | 248/188.7 |
| 4,085,763 | 4/1978 | Thomas | 248/413 |
| 4,278,223 | 7/1981 | Fauteux | 248/125 |

FOREIGN PATENT DOCUMENTS

| 2051705 | 12/1971 | Fed. Rep. of Germany | 248/413 |
| 2385361 | 12/1978 | France | 248/413 |
| 0760822 | 11/1956 | United Kingdom | 248/413 |
| 1140987 | 1/1969 | United Kingdom | 248/413 |

Primary Examiner—William H. Schultz
Assistant Examiner—Ramon O. Ramirez

[57] ABSTRACT

An adjustable telescopic support having a standard providing a hollow core, an elongated telescoping slide bar movable within the hollow core of the standard with the slide bar providing a tapered face extending downwardly and inwardly within the standard. The standard provides an adjustable member threadable into the hollow core of the standard for engaging the tapered face of the telescoping slide bar for adjustably maintaining the telescopic position of the slide bar within the hollow core of the standard. A base is provided for maintaining the standard in a vertical plane.

8 Claims, 5 Drawing Figures

ADJUSTABLE TELESCOPIC SUPPORT

SUMMARY OF THE INVENTION

This invention relates to an adjustable telescoping vertical support. The device provides a support which may be adjusted vertically through the rotation of a restraining member which will prevent inward telescopic movement of one member with respect to another.

Another object of this invention is to provide a support which will provide a stationary member and a second member adapted for inward telescoping movement with respect to the first member. The telescoping second member provides a tapered surface which extends in a downwardly and inwardly inclined plane with respect to the first member. A means movable transversely with respect to the vertical axis of the first member is adapted to engage the tapered face so as to prevent unwanted telescoping movement.

Still another object of this invention is to provide a base structure for the adjustable telescoping support for mounting the support in a vertical plane.

Yet a further object of this invention is to provide a safety catch which will prevent complete separation of the telescoping second member from the vertical extending first member.

Other objects will hereinafter be made apparent.

BRIEF DESCRIPTION OF THE DRAWINGS

The invention will be best understood by reference to the accompanying drawings illustrating the preferred form of the invention by which the stated objects are achieved, and which.

DESCRIPTION OF THE INVENTION

Figure 1:
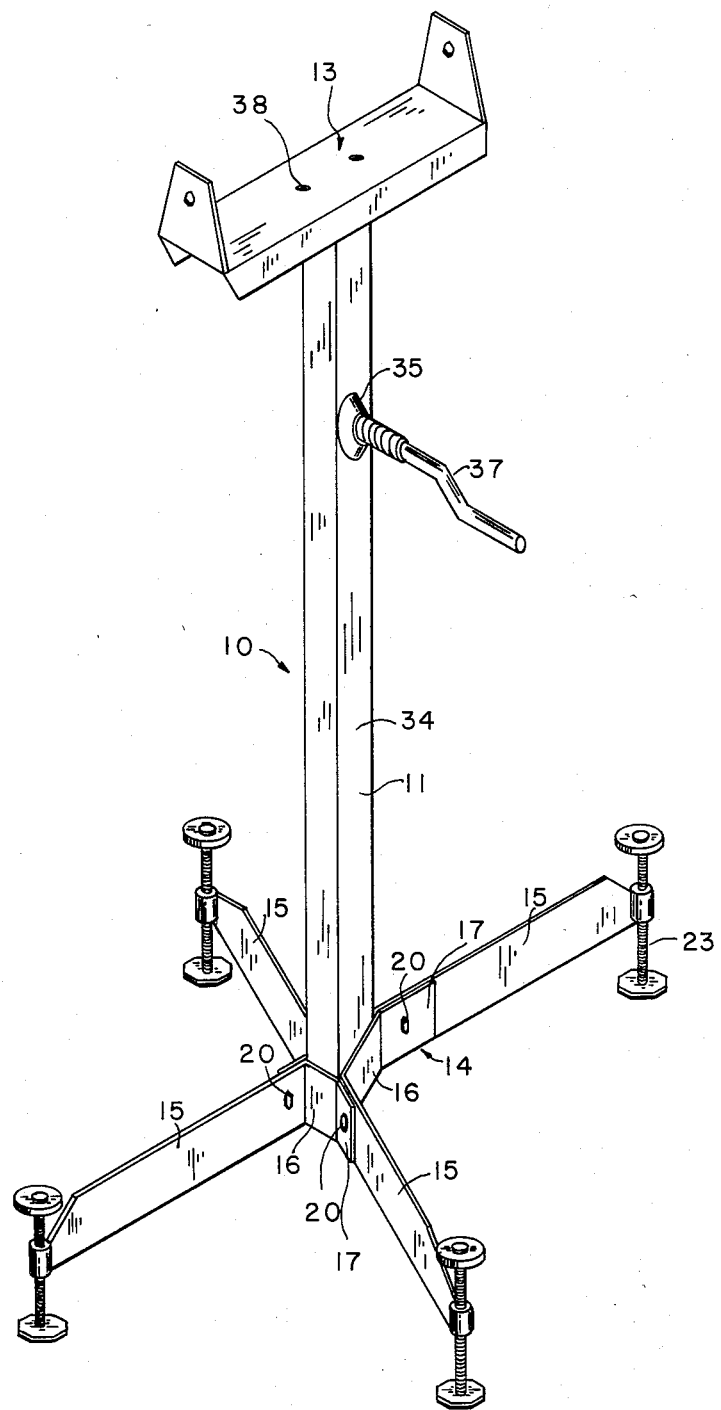
FIG. 1 is a perspective view of the adjustable support of this invention.

As illustrated, the adjustable support 10 of this invention generally includes an upright standard 11 having a hollow core 12, a mounting bracket 13, as well as a base unit 14. These parts are shown in FIG. 1 in their respective functional relationship.

Figure 4:
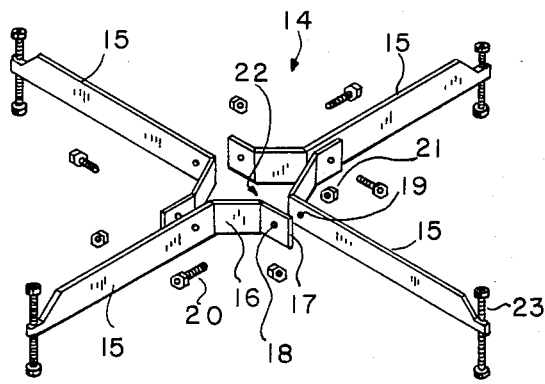
FIG. 4 is a fragmentary detailed sectional view illustrating the operational relationship of certain components of this invention.
Figure 5:
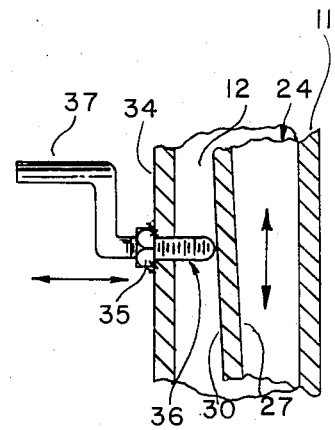
FIG. 5 is a knock down perspective view of the base unit for the adjustable support of this invention.

The base unit 14 provides a plurality of individual horizontal legs 15. Each leg provides at one end an angled face-engaging panel 16, which in turn terminates into an angled connecting flange 17. Each connecting flange 17 is provided with an aperture 18 which is adapted to be aligned with a like aperture 19 formed in the juxtapositioned leg 15. Through the apertures 18 and 19 are adapted to be projected a threaded bolt 20 which has then connected thereto a connecting nut 21. When each leg 15 of the base unit 14 is assembled, as shown in FIGS. 1 and 4, they will form a square socket 22 having dimensions equal to the outer configuration of the standard 11, and will embrace each of the side walls of the standard 11 to frictionally hold the same in a vertical upright position as illustrated in FIG. 1. The free ends of the legs 15 are provided with leveling screws 23 for permitting the adjustable support to be leveled on any surface.

Figure 2:
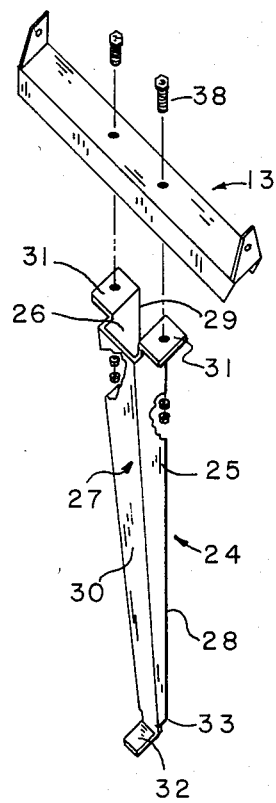
FIG. 2 is an exploded perspective view of the adjustable slide bar and support member of the invention.

Within the standard 11 and slidable throughout the hollow core 12 thereof is an adjustable vertical slide bar 24. As shown in FIG. 2, the adjustable slide bar 24 is of a one-piece construction and is U-shaped in cross section. By this construction the slide bar 24 consists of parallel side arms 25 and 26, together with a bight, or medial portion 27. The arms 25 and 26 at their free ends provide parallel straight edges 28 and 29. Each of the legs 25 and 26 are tapered from top to bottom throughout their length thus providing tapered edges at their line of junction with the medial portion 27. By this construction the medial portion 27 is provided with an exposed tapered face 30, as seen in FIG. 2.

Each of the arms 25 and 26 at their upper and widest end provide oppositely extending right angled connecting flanges 31. The medial portion 27 at its distant end where the arms 25 and 26 are their narrowest provides a restraining hook 32. This hook 32 extends parallel and in an opposite direction to the bottom edges 33 of the arms 25 and 26.

Figure 3:
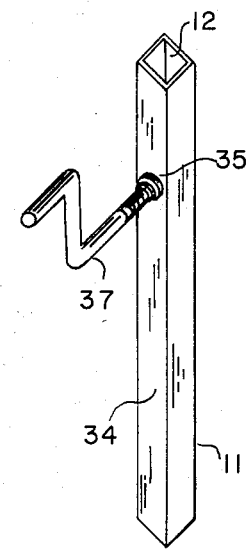
FIG. 3 is a perspective view of the upright standard and control handle of this invention.

As shown in FIGS. 1 and 3, one side wall 34 of the standard 11 provides a reinforced threaded boss 35 which has open communication through the wall 34 with the hollow core 12. Adapted to be threaded through the boss 35 is the threaded end 36 of a crank handle 37.

To permit the insertion of the bar 24 in the hollow core 12 of the standard 11, the threaded end 36 of the crank 37 must be withdrawn from the hollow core 12 so that the restraining hook 32 may pass therebeyond.

When the slide bar 24 is placed within the hollow core 12 of the standard 11 it is free to move vertically therethrough. The slide bar 24 is so placed within the hollow core 12 of the standard 11 such that the straight edges 28 and 29 of the arms 25 and 26 have facial contact with the inner wall surface of the standard 11, as shown in FIG. 4. In such inserted position the tapered face 30 of the medial portion 24 of the U-shaped slide bar 24 faces the wall 34 as well as the threaded boss 35.

When the slide bar 24 is vertically positioned relative to the standard 11 the crank 37 is threaded into the bushing 35 until its inner distal end 36 engages the tapered face 30 of the medial portion 27 of the slide bar 24. In such a position the slide bar 24 is restrained from moving downwardly through the standard 11. As the crank 37 is rotated in an anti clockwise direction withdrawing the threaded end 36, out of the hollow core 12, the slide bar 24 will be permitted to slowly move downwardly through the standard 11, maintaining the tapered face 30 of the medial portion 27 thereof in constant contact with the crank 37. Thus, a gradual telescoping adjustment may be obtained without fear of sudden collapse or movement of the slide bar 24 within the standard 11. The restraining hook 32 substantially filling the hollow core 12, will prevent complete withdrawal of the slide bar 24 out of the standard 11 when the crank is less than fully withdrawn from projection into the hollow core 12.

Adapted to be mounted on the flanges 31 of the slide bar 24 can be any form of a support member such as the supporting bracket 13 as shown in FIGS. 1 and 2. This support bracket 13 is by nuts and bolts 38 removably connected to the slide bar 24 and thus can be readily replaced with any other form of support.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described the invention, what I claim as new and desire to secure by Letters Patent is:

1. An adjustable vertical support comprising;
   (a) a square shaped standard having a hollow core,
   (b) a base for said standard for supporting the same in a vertical position,
   (c) an elongated U-shaped supporting means movable vertically within the hollow core of said standard,
   (d) said U-shaped supporting means providing a pair of parallel arms, one edge of each arm being tapered throughout its length so as to provide therebetween an inclined medial face portion,
   (e) said parallel arms providing at their free elongated margins parallel straight edges adapted to have sliding contact with the inner wall surface of one wall of said hollow core of said standard so as to maintain said supporting means in axial alignment with said hollow core as it moves therethrough,
   (f) said medial face portion of said U-shaped supporting means adapted to be spaced from a confronting inner wall surface of said hollow core of said standard when said supporting means is movably positioned therein, and
   (g) means provided by said standard and adjustably projectable through said one confronting inner wall surface into binding contact with said inclined medial face of said supporting means for restraining vertical movement of said supporting means in one direction into said said standard while permitting free movement of said supporting means in an opposite direction out of said standard.

2. An adjustable vertical support as defined by claim 1, wherein said means provided by said standard projectable within its hollow core and into contact with said one longitudinal inclined face of said support means comprising a rotatable crank having a handle end exterior of said support and a bearing end threadable through one wall of said standard and into contact with said one inclined face of said support so as to be in binding contact with said support at any point along its inclined length to prevent vertical movement of said support means relative to said standard.

3. An adjustable vertical support as defined by claim 1, wherein said means provided by said standard projectable within its hollow core and into contact with said one longitudinal inclined face of said support means comprising a rotatable crank having a handle end exterior of said support and a bearing end threadable through one wall of said standard and into contact with said one inclined face of said support so as to be in binding contact with said support at any point along its inclined length to prevent vertical movement of said support means relative to said standard, and wherein said support means comprises a one-piece member U-shaped in cross section and providing longitudinal vertically disposed edges and an opposite longitudinally extending inclined surface.

4. An adjustable vertical support as defined by claim 1, wherein said parallel arms of said U-shaped member are of a width equal to the inner diameters of said hollow core and tapered longitudinally to a diameter less than that of said hollow core with the free ends of said arms parallel to and in facial engagement with a corresponding wall surface of said hollow core.

5. An adjustable vertical support as defined by claim 1, including means on the inner end of said supporting means extending tangentially with respect to said one face thereof and movable therewith and into contact with said means for restraining vertical movement of said support so as to prevent complete separation of said supporting means from said hollow core of said standard.

6. An adjustable vertical support as defined by claim 2, including means on the inner end of said supporting means extending tangentially with respect to said one face thereof and movable therewith and into contact with said means for restraining vertical movement of said support so as to prevent complete separation of said supporting means from said hollow core of said standard.

7. An adjustable vertical support as defined by claim 1, wherein said base comprises a plurality of individual leg members of identical construction with each leg member providing means for connection to another leg member to form a socket for securing said standard to said base in a vertical plane.

8. An adjustable vertical support as defined by claim 2, wherein said base comprises a plurality of individual leg members of identical construction with each leg member providing means for connection to another leg member to form a socket for securing said standard to said base in a vertical plane.

* * * * *